United States Patent
Takahashi

(10) Patent No.: US 6,775,212 B2
(45) Date of Patent: Aug. 10, 2004

(54) DATA REPRODUCTION APPARATUS, DATA REPRODUCTION METHOD, AND DATA REPRODUCING PROGRAM RECORDING MEDIUM

(75) Inventor: Yorio Takahashi, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 478 days.

(21) Appl. No.: 09/890,961

(22) PCT Filed: Feb. 16, 2001

(86) PCT No.: PCT/JP01/01113

§ 371 (c)(1),
(2), (4) Date: Oct. 17, 2001

(87) PCT Pub. No.: WO01/61698

PCT Pub. Date: Aug. 23, 2001

(65) Prior Publication Data

US 2002/0136117 A1 Sep. 26, 2002

(30) Foreign Application Priority Data

Feb. 16, 2000 (JP) ........................................ 2000-038687

(51) Int. Cl.$^7$ ................................................. G11B 5/09
(52) U.S. Cl. .................................... 369/47.3; 369/53.45
(58) Field of Search ........................... 369/47.23, 47.24, 369/47.28, 47.29, 47.3, 47.38, 47.39, 53.3, 53.37, 53.43, 53.45

(56) References Cited

U.S. PATENT DOCUMENTS

| 5,313,443 A | 5/1994 | Iitsuka |
| 5,414,686 A | 5/1995 | Iitsuka |
| 5,963,517 A * | 10/1999 | Nakagaki et al. ........ 369/53.14 |
| 5,982,570 A | 11/1999 | Koizumi et al. |
| 6,151,182 A | 11/2000 | Koizumi et al. |
| 6,229,776 B1 * | 5/2001 | Kuwayama et al. ....... 369/52.1 |

FOREIGN PATENT DOCUMENTS

| EP | 0277019 A2 | 8/1988 |
| EP | 0440224 A2 | 8/1991 |
| EP | 0686971 A2 | 12/1995 |
| JP | 3-228261 | 10/1991 |
| JP | 7-334950 | 12/1995 |
| JP | 11-306641 | 11/1999 |
| JP | 11-306661 | 11/1999 |

* cited by examiner

Primary Examiner—Paul W. Huber
(74) Attorney, Agent, or Firm—Wenderoth, Lind & Ponack, L.L.P.

(57) ABSTRACT

The present invention relates to control of the reproduction speed of a recording medium on which data are recorded, and provides a data reproduction apparatus and a data reproduction method which are able to control the data reproduction speed according to the reproduction frequencies of different data to suppress power consumption and heat generation. When data of the CD-ROM standard or the like, which are temporarily stored in a processing part or the like, are reproduced after data of the CD-DA standard or the like, which are to be sequentially converted and outputted, are reproduced at a first reproduction speed, the reproduction is performed at a third reproduction speed that is lower than the highest second reproduction speed and higher than the first reproduction speed.

54 Claims, 6 Drawing Sheets

DATA REPRODUCTION APPARATUS, DATA REPRODUCTION METHOD, AND DATA REPRODUCING PROGRAM RECORDING MEDIUM

This application is a 371 of PCT/JP01/01113, filed Feb. 16, 2001.

TECHNICAL FIELD

The present invention relates to an apparatus and a method for reproducing a recording medium on which data are recorded, such as a compact disk, a digital audio tape, an optical video disk or the like, and a data reproducing program recording medium and, more particularly, to control of the reproduction speed of the recording medium on which data are recorded.

BACKGROUND ART

In recent years, there are some recording mediums in which an audio signal or a video signal and data such as usual program or text data are mixed according to their standards. For example, there are, typically, a disk of MIX MODE which records data of a usual program or the like, that is data of the CD-ROM standard, on a first track, and records audio data of the CD-DA standard on second and subsequent tracks, and a disk of CD-EXTRA which performs recording in multiple session, records audio data of the CD-DA standard on a first session, and records data of a usual program or the like, that is data of the CD-ROM standard, on second and subsequent sessions. Further, data reproduction apparatuses for reproducing these recording mediums have also been widespread.

As a conventional example of the above-described data reproduction apparatus, "DATA REPRODUCTION APPARATUS AND DATA REPRODUCTION METHOD" disclosed in Japanese Published Patent Application No. Hei. 7-7579 is raised.

The data reproduction apparatus as mentioned above reproduces a recording medium on which data are recorded, at a first reproduction speed, when it outputs reproduced data while sequentially converting them into a form of such as an audio signal or a video signal that can be outputted to the outside. On the other hand, the reproduction apparatus performs reproduction at a second reproduction speed that is higher than the first reproduction speed, when it temporarily stores reproduced data such as a usual program or the like in the data reproduction apparatus, processes the data as required after the reproduction is ended, and outputs the data to the outside.

In the case where the data reproduction apparatus outputs the reproduced data while sequentially converting them into a form that can be outputted to the outside, since a data recording speed is usually determined by the standard of a recording medium on which an audio signal or a video signal is recorded, generally reproduction is performed at a reproduction speed that is determined by the format of the recording medium as a first reproduction speed, or at a reproduction speed that is somewhat higher than the reproduction speed determined by the format of the recording medium as a first reproduction speed, and the read data are temporarily stored in a buffer memory in the data reproduction apparatus, and then the stored data are sequentially converted into a form of such as an audio signal or a video signal that can be outputted to the outside.

On the other hand, in the case where the data reproduction apparatus temporarily stores the reproduced data in the apparatus, processes the data as required after the reproduction is ended, and then outputs the data to the outside, generally reproduction is performed at a maximum reproduction speed the data reproduction apparatus can realize as a second reproduction speed, and data are read at a high speed and stored in the data reproduction apparatus.

However, data reproduction apparatuses have been on the trail of speedup in recent years and, accordingly, the rotation speeds of disks such as CD-ROM have also increased considerably. As the result, a difference in speeds, between the first reproduction speed in the case where an audio signal or a video signal is sequentially reproduced, and the second reproduction speed in the case where data are temporarily stored in the data reproduction apparatus, has been increasing considerably.

Therefore, data to be reproduced at the first reproduction speed, such as audio data, and data to be reproduced at the second reproduction speed, such as usual program data, are mixed in the recording medium, and when there is a need to switch the reproduction speed, a rapid change in the reproduction speed is required, resulting in a heat generation and an increase in power consumption as well as an increase in the time taken to reproduce the audio data.

Further, even in the recording medium on which the data to be reproduced at the first reproduction speed and the data to be reproduced at the second reproduction speed are mixedly recorded, there are cases as follows: a case where the data to be reproduced at the first reproduction speed are not reproduced after the data to be reproduced at the second reproduction speed are read, and a case where the frequency of reproduction of the data to be reproduced at the first reproduction speed is very low. There are conversely a case where the data to be reproduced at the second reproduction speed are not read after the data to be reproduced at the first reproduction speed are reproduced, and a case where the frequency of reproduction of the data to be reproduced at the second reproduction speed is very low. There has been no data reproduction apparatus which controls the reproduction speed of a disk according to the frequency of the reproduction of data recorded on the recording medium.

The present invention is made to solve the above-mentioned problems and has for its object to provide a data reproduction apparatus, a data reproduction method, and a recording medium, which suppress power consumption and heat generation of a data reproducing device according to the data reproduction frequency to enhance the total performance of a drive.

DISCLOSURE OF THE INVENTION

In order to solve the above-described problems, a data reproduction apparatus comprises: a reproduction means for reproducing a recording medium on which data are recorded, and outputting the data; at least one output means for outputting input data while sequentially converting the input data into a form of such as an audio signal or a video signal that can be outputted to the outside; a processing means for temporarily storing the data reproduced by the reproduction means, and processing the data as required after the reproduction of the recording medium is ended; an output destination judging means for judging whether the data to be reproduced by the reproduction means should be outputted to the output means or the processing means; and a reproduction speed control means for controlling the reproduction means so as to reproduce the recording medium at a first reproduction speed when the output destination judging means judges that the data in the recording medium are to be outputted to the output means, controlling the reproduction means so as to reproduce the recording medium at a second reproduction speed higher than the first reproduction speed when the output destination judging means judges that the data in the recording medium are to be outputted to the processing means except after the reproduction has been performed at the first reproduction speed, and controlling the reproduction means so as to reproduce the recording medium at a third reproduction speed that is higher than the first reproduction speed and lower than the second reproduction speed when the output destination judging means judges that the data in the recording medium are to be outputted to the processing means after the reproduction has been performed at the first reproduction speed.

According to the present invention, the reproduction speed is switched between the lowest reproduction speed and the third reproduction speed which is higher than the lowest speed and lower than the highest speed, instead of switching the reproduction speed between the lowest reproduction speed and the highest reproduction speed, whereby power consumption of the data reproduction apparatus and heat generation are reduced, and the time required for switching the reproduction speed is reduced.

According to another embodiment of the present invention, the third reproduction speed is approximately equal to the first reproduction speed.

According to the present invention, power consumption, heat generation, and the time required for speed switching can be further reduced. Particularly, in the case where data to be reproduced at the lowest speed are reproduced at the somewhat higher speed, a reduction in the reproduction speed when reading data to be reproduced at the highest speed is small.

According to the present invention, the data reproduction apparatus further comprises: a recording medium moving means for locating the recording medium in a reproducible state in the reproduction apparatus, and ejecting the recording medium from the reproduction apparatus; and a recording medium exchange detecting means for detecting that the recording medium is ejected and relocated by the recording medium moving means; wherein the reproduction speed control means controls the reproduction means so as to reproduce the recording medium at the second reproduction speed when the output destination judging means judges that the data in the recording medium are to be outputted to the processing means after the recording medium exchange detecting means detects exchange of the recording medium.

According to the present invention, in the case where data to be reproduced at the highest speed are reproduced first after the disk is changed, the reproduction speed can be the highest, whereby the performance of the drive is enhanced. Particularly, when only data to be reproduced at the highest speed are reproduced after disk exchange, reproduction of the disk can always be performed at the highest speed.

According to the present invention, the data reproduction apparatus further comprises: a timer unit for outputting a notification signal which notifies that the reproduction means has not outputted the reproduced data to the output means and the processing means for a predetermined period of time; wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

According to the present invention, when it is judged that the reproduction frequency of data to be reproduced at a low reproduction speed is low, data to be reproduced at a high reproduction speed, which follow the data to be reproduced at the low reproduction speed, are reproduced at a higher speed, whereby the performance of the drive is enhanced.

According to the present invention, the data reproduction apparatus further comprises: a timer unit for outputting a notification signal which notifies that the reproduction means has not outputted the reproduced data to the output means and the processing means for a predetermined period of time; wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

According to the present invention, after it is judged that reproduction has not been performed for a predetermined period of time, data to be reproduced at the highest reproduction speed are reproduced at a high speed, whereby the performance of the drive is enhanced.

According to another embodiment of the present invention, the fourth reproduction speed is approximately equal to the second reproduction speed.

According to the present invention, the performance of the drive can be further enhanced. Particularly, in the case where data to be reproduced at the lowest speed are hardly reproduced, switching of the reproduction speed, that causes an increase in power consumption and heat generation, is hardly performed.

According to the present invention, in the data reproduction apparatus, on a disk, data are recorded at a constant angular velocity on tracks formed concentrically or spirally, and the reproduction speed is switched by changing the disk rotation speed.

According to the present invention, the reproduction speed can be controlled.

According to the present invention, in the data reproducing device, on a disk, data are recorded at a constant linear velocity on tracks formed concentrically or spirally, and the reproduction speed is switched by changing the reproduction linear speed or the disk rotation speed.

According to the present invention, the reproduction speed can be controlled.

According to the present invention, a data reproduction method comprises: a reproducing step of reproducing a recording medium on which data are recorded, and outputting the data; at least one output step of outputting input data while sequentially converting the input data into a form of such as an audio signal or a video signal that can be outputted to the outside; a processing step of temporarily storing the data reproduced in the reproduction step, and processing the data as required after the reproduction of the recording medium is ended; an output destination judging step of judging whether the data to be reproduced in the reproduction step should be outputted to the output step or the processing step; and a reproduction speed control step of controlling the reproduction step so as to reproduce the recording medium at a first reproduction speed when the output destination judging step judges that the data in the recording medium are to be outputted to the output step, controlling the reproduction step so as to reproduce the recording medium at a second reproduction speed higher than the first reproduction speed when the output destination judging step judges that the data in the recording medium are to be outputted to the processing step except after the reproduction has been performed at the first reproduction speed, and controlling the reproduction step so as to reproduce the recording medium at a third reproduction speed that is higher than the first reproduction speed and lower than the second reproduction speed when the output destination judging step judges that the data in the recording medium are to be outputted to the processing step after the reproduction has been performed at the first reproduction speed.

According to the present invention, the reproduction speed is switched between the lowest reproduction speed and the third reproduction speed which is higher than the lowest speed and lower than the highest speed, instead of switching the reproduction speed between the lowest reproduction speed and the highest reproduction speed, whereby power consumption of the data reproduction apparatus and heat generation are reduced, and the time required for switching the reproduction speed is reduced.

According to the present invention, the data reproduction method further comprises: a recording medium moving step of locating the recording medium in a reproducible state in a reproduction apparatus, and ejecting the recording medium from the reproduction apparatus; and a recording medium exchange detecting step of detecting that the recording medium is ejected and relocated in the recording medium moving step; wherein the reproduction speed control step controls the reproduction step so as to reproduce the recording medium at the second reproduction speed when the output destination judging step judges that the data in the recording medium are to be outputted to the processing step after the recording medium exchange detecting step detects exchange of the recording medium.

According to the present invention, in the case where data to be reproduced at the highest speed are reproduced first after the disk is changed, the reproduction speed can be the highest, whereby the performance of the drive is enhanced. Particularly, when only data to be reproduced at the highest speed are reproduced after disk exchange, reproduction of the disk can always be performed at the highest speed.

According to the present invention, the data reproduction method further comprises: a timer unit for outputting a notification signal which notifies that the reproduction step has not outputted the reproduced data to the output step and the processing step for a predetermined period of time; wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

According to the present invention, when it is judged that the reproduction frequency of data to be reproduced at a low reproduction speed is low, data to be reproduced at a high reproduction speed, which follow the data to be reproduced at the low reproduction speed, are reproduced at a higher speed, whereby the performance of the drive is enhanced.

According to the present invention, the data reproduction method further comprises: a timer unit for outputting a notification signal which notifies that the reproduction step has not outputted the reproduced data to the output step and the processing step for a predetermined period of time; wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

According to the present invention, after it is judged that reproduction has not been performed for a predetermined period of time, data to be reproduced at the highest reproduction speed are reproduced at a high speed, whereby the performance of the drive is enhanced.

According to the present invention, in a recording medium containing a program for executing a data reproduction method, the program comprises: a reproducing step of reproducing a recording medium on which data are recorded, and outputting the data; at least one output step of outputting input data while sequentially converting the input data into a form of such as an audio signal or a video signal that can be outputted to the outside; a processing step of temporarily storing the data reproduced in the reproduction step, and processing the data as required after the reproduction of the recording medium is ended; an output destination judging step of judging whether the data to be reproduced in the reproduction step should be outputted to the output step or the processing step; and a reproduction speed control step of controlling the reproduction step so as to reproduce the recording medium at a first reproduction speed when the output destination judging step judges that the data in the recording medium are to be outputted to the output step, controlling the reproduction step so as to reproduce the recording medium at a second reproduction speed higher than the first reproduction speed when the output destination judging step judges that the data in the recording medium are to be outputted to the processing step except after the reproduction has been performed at the first reproduction speed, and controlling the reproduction step so as to reproduce the recording medium at a third reproduction speed that is higher than the first reproduction speed and lower than the second reproduction speed when the output destination judging step judges that the data in the recording medium are to be outputted to the processing step after the reproduction has been performed at the first reproduction speed.

According to the present invention, the reproduction speed is switched between the lowest reproduction speed and the third reproduction speed which is higher than the lowest speed and lower than the highest speed, instead of switching the reproduction speed between the lowest reproduction speed and the highest reproduction speed, whereby power consumption of the data reproduction apparatus and heat generation are reduced, and the time required for switching the reproduction speed is reduced.

BEST MODE TO EXECUTE THE INVENTION (Embodiment 1)

Hereinafter, a data reproduction apparatus and a data reproduction method according to a first embodiment of the present invention will be described with reference to FIGS. 1 and 2. In this embodiment, a description will be given taking a disk type recording medium, such as a CD or a CD-R, as an example of a recording medium.

Figure 1:
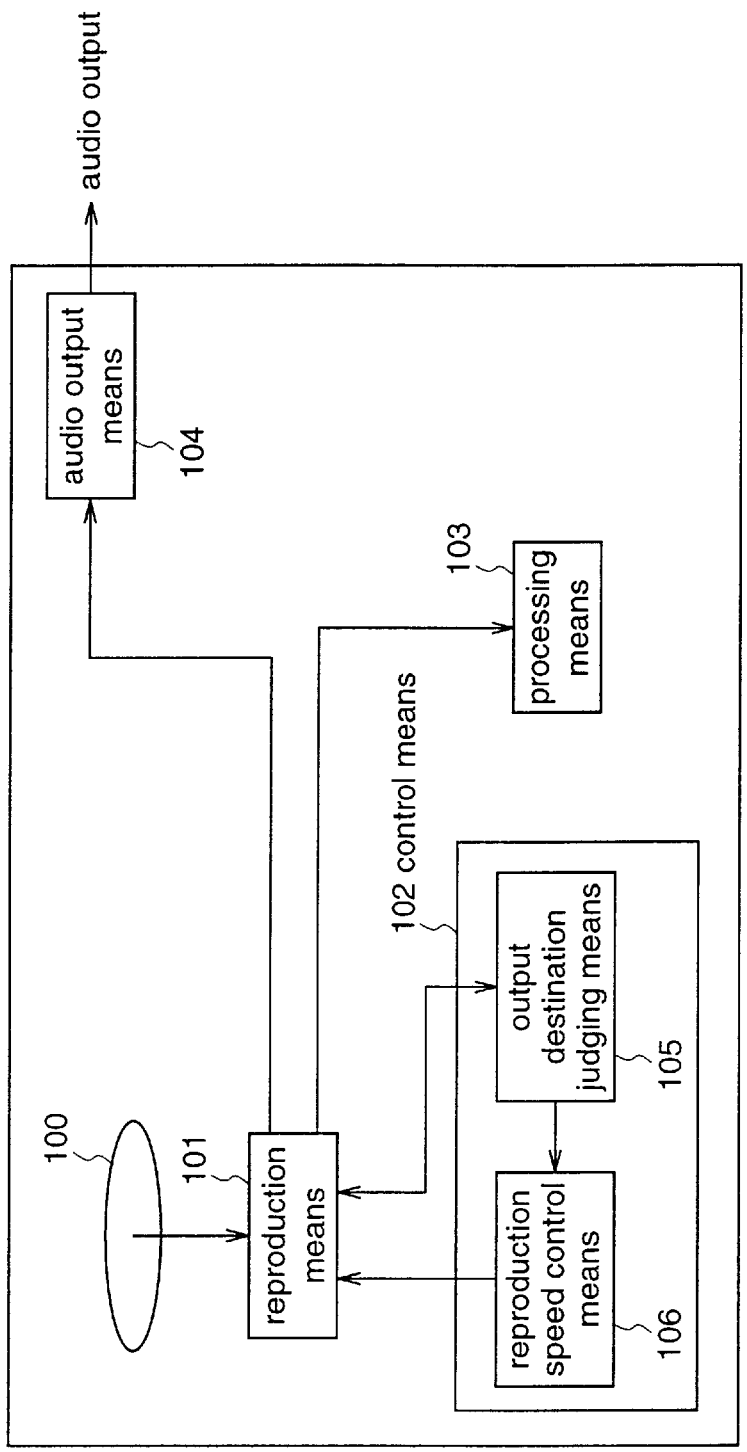
FIG. 1 is a block diagram illustrating an example of a data reproduction apparatus according to a first embodiment of the present invention.

FIG. 1 is a block diagram illustrating an example of a data reproduction apparatus according to the first embodiment of the present invention.

In FIG. 1, 100 denotes a recording medium on which data are recorded, such as an optical disk, a magneto-optical disk, or a magnetic disk, where data tracks are recorded concentrically or spirally. Further, the data reproduction apparatus according to the first embodiment of the present invention comprises a reproduction means 101, a control means 102, a processing means 103, and an audio output means 104.

The reproduction means 101 is constituted by a pickup, an EFM demodulation circuit, an error correcting circuit, and the like, and reproduces data recorded on the disk 100. The control means 102 is provided with an output destination judging means 105 for judging a destination of output on the basis of the contents of data reproduced by the reproduction means 101, and a reproduction speed control means 106 for controlling the reproduction speed of the disk 100.

The contents of data to be reproduced by the reproduction means 101 can be known from, for example, a header that is attached to the data on the disk 100 and indicates the contents of the data, or the contents of a data reproduction instruction that is made to the data reproduction apparatus.

The processing means 103 has a memory for storing the data reproduced by the reproduction means 101, temporarily stores the data reproduced by the reproduction means 101 in the memory, and performs a process as required after reproduction by the reproduction means 101 is ended. The process performed by the processing means 103 is, for example, to execute a process execution program when the read data are a program for executing some process, or to decompress the read data when the data are compressed data.

The audio output means 104 sequentially converts the reproduced audio data into audio signals, and outputs the audio signals.

While in this first embodiment a description is given of the data reproduction apparatus having only the audio output means 104 as an output means, the present invention is not restricted thereto. Any data reproduction apparatus, such as one having a video output means and the like for reproducing video data, may be employed so long as it has at least one output means for outputting the data reproduced by the reproduction means 101.

Figure 2:
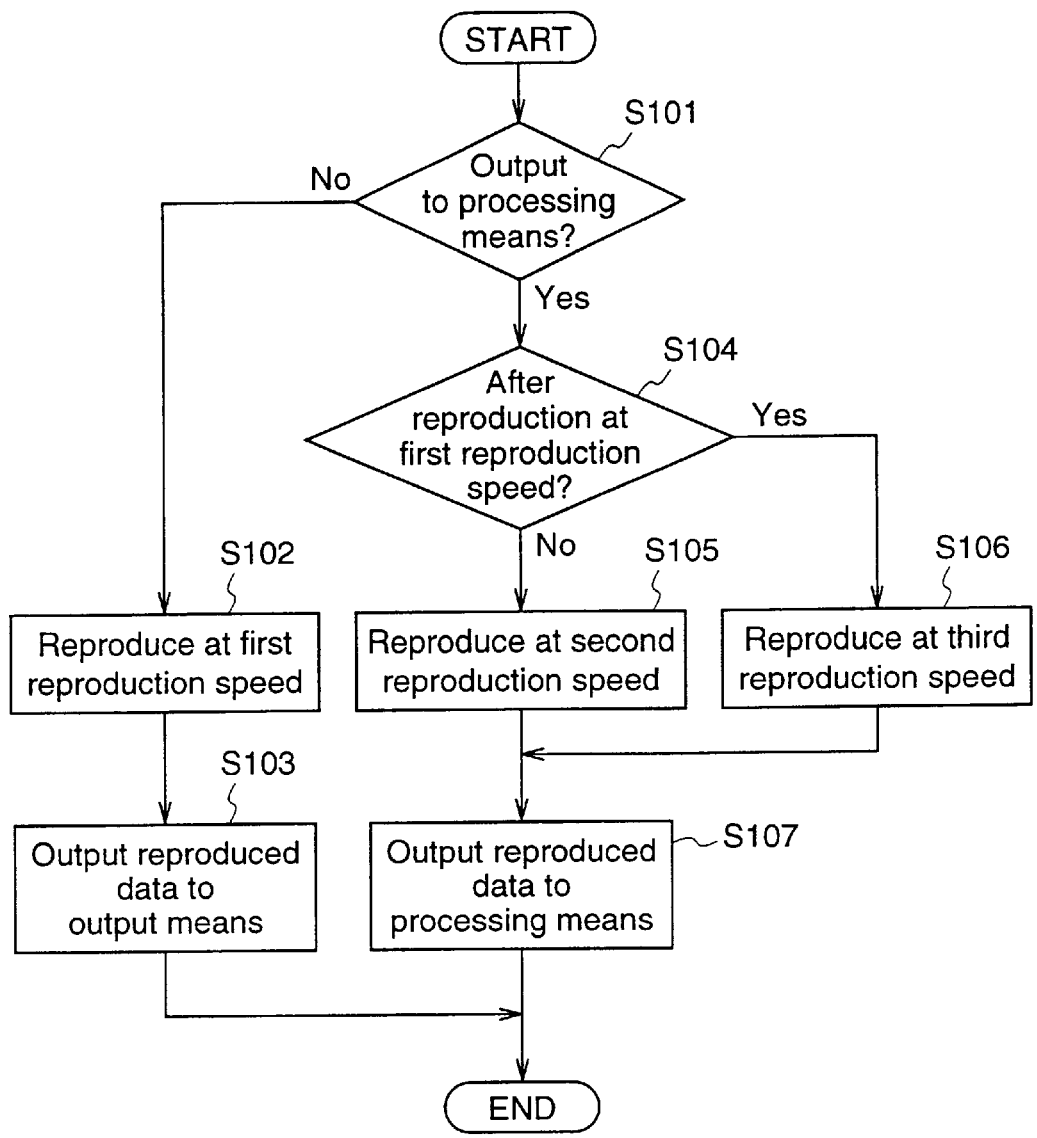
FIG. 2 is a flow chart illustrating a data reproduction method according to the first embodiment of the invention.

FIG. 2 is a flow chart illustrating a data reproduction method executed by the data reproduction apparatus according to the first embodiment of the invention.

Hereinafter, a description will be given of the operation performed by each part in FIG. 1 in each step of the data reproduction method according to the first embodiment illustrated in FIG. 2.

(Step S101) The output destination judging means 105 judges whether the data to be reproduced by the reproduction means 101 should be outputted to the processing means 103 or the audio output means 104 as an output means, on the basis of the contents of the data to be reproduced. Specifically, for example, when the data to be reproduced are music data of the CD-DA standard or the like, which are to be sequentially converted and outputted, the judging means 105 judges that the data are to be outputted to the audio output means 104 as an output means. When the data to be reproduced are data of the CD-ROM standard, such as program data, which are to be temporarily stored in the processing means 103, the judging means 105 judges that the data are to be outputted to the processing means 103.

When the output destination judging means 105 judges to output the data to be reproduced to the audio output means 104 as an output means, the process goes to Step S102. On the other hand, when the output destination judging means 105 judges to output the data to be reproduced, to the processing means 103, the process goes to Step S104.

(Step S102) The reproduction speed control means 106 controls the reproduction means 101 so as to reproduce the data on the disk 100 at a first reproduction speed.

The first reproduction speed includes a case where reproduction is performed at the same speed as an audio data reproduction speed that is predetermined by the standard of the disk 100, or a case where data reproduction is performed at a speed higher than the predetermined reproduction speed. When data reproduction is performed at a speed higher than the predetermined reproduction speed, the data on the disk 100, which have been read, are stored in a buffer memory possessed by the reproduction means 101, and are sequentially sent to the audio output means 104 at a predetermined speed, whereby reproduction is carried out. Thus, even when the reproduction means 101 temporarily becomes incapable of data reading due to an external factor such as vibrations or defects on the disk 100, the data stored in the buffer memory can be continuously sent to the audio output means 104, whereby the output data are prevented from being interrupted.

(Step S103) The reproduction means 101 outputs the data reproduced at the first reproduction speed to the audio output means 104 as an output means, on the basis of the instruction from the output destination judging means 105.

(Step S104) The reproduction speed control means 106 judges whether it is after reproduction at the first reproduction speed or not. When it is not after reproduction at the first speed, the process goes to Step S105, and when it is after reproduction at the first speed, the process goes to Step S106. The reproduction speed control means 106 stores whether or not the disk 100 is reproduced at the first reproduction speed before the data to be reproduced.

(Step S105) The reproduction speed control means 106 controls the reproduction means 101 so as to reproduce the data on the disk 100 at a second reproduction speed.

The second reproduction speed is generally a maximum reproduction speed the data reproduction apparatus can realize. However, in the case of using a disk of the CD-ROM standard, there are data having error correcting information (ECC) for program and data, and data in a format having no error correcting information. When the latter data are to be read, reproduction is sometimes performed at a reproduction speed lower than the maximum reproduction speed the data reproduction apparatus can realize, in order to prevent reliability of the data from being reduced.

(Step S106) The reproduction speed control means 106 controls the reproduction means 101 so as to reproduce the data on the disk 100 at a third reproduction speed.

The third reproduction speed is higher than the first reproduction speed and lower than the second reproduction speed.

(Step S107) The reproduction means 101 outputs the reproduced data to the processing means 103 on the basis of the instruction from the output destination judging means 105.

Control of the reproduction speed by the reproduction means 101 is performed by changing the disk rotation speed when data are recorded at a constant angular velocity (hereinafter, referred to as "CAV") on tracks formed concentrically or spirally on the disk 100, or by changing the reproduction linear speed or the disk rotation speed when data are recorded at a constant linear velocity (hereinafter, referred to as "CLV") on tracks formed concentrically or spirally on the disk 100.

Next, the operation of the data reproduction apparatus according to the first embodiment of the present invention will be described case by case according to the kinds of data recorded on the recording medium.

When only data of the CD-ROM standard are recorded on the disk 100, a judgement on an output destination of the reproduced data is performed by the output destination judging means 105, and an instruction for outputting the reproduced data to the processing means 103 is outputted to the reproduction means 101 and the reproduction speed control means 106. The reproduction speed control means controls the reproduction means 101 so as to perform reproduction of the disk 100 at the fast second reproduction speed at all times on the basis of the instruction from the output destination judging means 105. Further, the reproduction means 101 outputs the reproduced data to the processing means 103 according to the instruction from the output destination judging means 105.

Next, when only audio data of the CD-DA standard are recorded on the disk 100, a judgement on an output destination of the reproduced data is performed by the output destination judging means 105, and an instruction for outputting the reproduced data to the audio output means 104 as an output means is outputted to the reproduction means 101 and the reproduction speed control means 106. The reproduction speed control means controls the reproduction means 101 so as to perform reproduction of the disk 100 at the first reproduction speed at all times on the basis of the instruction from the output destination judging means 105. The reproduction means 101 outputs the reproduced data to the audio output means 104 as an output means according to the instruction from the output destination judging means 105.

Next, when the data of the CD-ROM standard and the audio data of the CD-DA standard are mixedly recorded on the disk 100, a judgement on an output destination of the reproduced data is performed by the output destination judging means 105, and the reproduction speed control means 106 controls the reproduction speed of the disk 100 on the basis of the result of judgement by the output destination judging means 105.

For example, in the case where the data of the CD-ROM standard are to be reproduced first, the output destination judging means 105 judges this, and an instruction for outputting the reproduced data to the processing means 103 is outputted to the reproduction means 101 and the reproduction speed control means 106. The reproduction speed control means controls the reproduction means 101 so as to perform reproduction of the disk 100 at the fast second reproduction speed on the basis of the instruction from the output destination judging means 105. The reproduction means 101 outputs the reproduced data to the processing means 103 according to the instruction from the output destination judging means 105.

As a result, on the disk where the audio data of the CD-DA standard and the data of the CD-ROM standard are mixed, when only the data of the CD-ROM standard are reproduced or while only the data of the CD-ROM standard is reproduced first, reproduction can be performed at a maximum speed the drive can have.

Next, in the case where reproduction of the audio data of the CD-DA standard is performed after reproduction of the data of the CO-ROM standard, the output destination judging means 105 judges this, and an instruction for outputting the reproduced data to the audio output means 104 as an output means is outputted to the reproduction means 101 and the reproduction speed control means 106. The reproduction speed control means controls the reproduction means 101 so as to perform reproduction of the disk 100 at the first reproduction speed on the basis of the instruction from the output destination judging means 105. Further, the reproduction means 101 outputs the reproduced data to the audio output means 104 as an output means according to the instruction from the output destination judging means 105.

In the case where the data of the CD-ROM standard are reproduced again after the above-mentioned audio data of the CD-DA standard are reproduced, the output destination judging means 105 judges this, and an instruction for outputting the reproduced data to the processing means 103 is outputted to the reproduction means 101 and the reproduction speed control means 106. The reproduction speed control means controls the reproduction means 101 so as to perform reproduction of the disk 100 at a third reproduction speed that is higher than the first reproduction speed and lower than the second reproduction speed on the basis of the instruction from the output destination judging means 105. Further, the reproduction means 101 outputs the reproduced data to the processing means 103 according to the instruction from the output destination judging means 105.

As described above, according to the data reproduction apparatus and the data reproduction method of the first embodiment, in the case where reproduction of the data of the CD-ROM standard is performed after reproduction of the disk at the first reproduction speed, the reproduction is performed not at the highest second reproduction speed but at the third reproduction speed. Thus, the reproduction speed is switched between the first reproduction speed and the third reproduction speed, whereby power consumption and heat generation are reduced and the time required for switching the reproduction speed is reduced, as compared with the case where the reproduction speed is switched between the first reproduction speed and the second reproduction speed. In addition, thereafter, when the audio data of the CD-DA standard are reproduced, power consumption and heat generation required for switching the data reproduction speed to the first reproduction speed are reduced, and the time required for switching the reproduction speed is reduced.

Further, when the third reproduction speed is approximately equal to the first reproduction speed, power consumption and heat generation is further reduced, and the time required for speed switching is further reduced. Particularly, in the case where the audio data of the CD-DA standard are reproduced, when reproduction of the data is carried out at, as the first reproduction speed, a speed higher than the reproduction speed that is previously determined by the standard of the disk 100, a decrease in the reproduction speed when reading the data of the CD-ROM standard is small.

(Embodiment 2)

A data reproduction apparatus and a data reproduction method according to a second embodiment of the present invention will be described with reference to FIGS. 3 and 4. The same constituents as those described in the first embodiment are denoted by the same reference numerals, and description thereof will be omitted.

The data reproduction apparatus and the data reproduction method according to the second embodiment of the present invention always performs reproduction of the disk 100 at the second reproduction speed in the case where the data of the CD-ROM standard, which are temporarily stored in the processing unit 103, are reproduced after the disk is exchanged.

Figure 3:
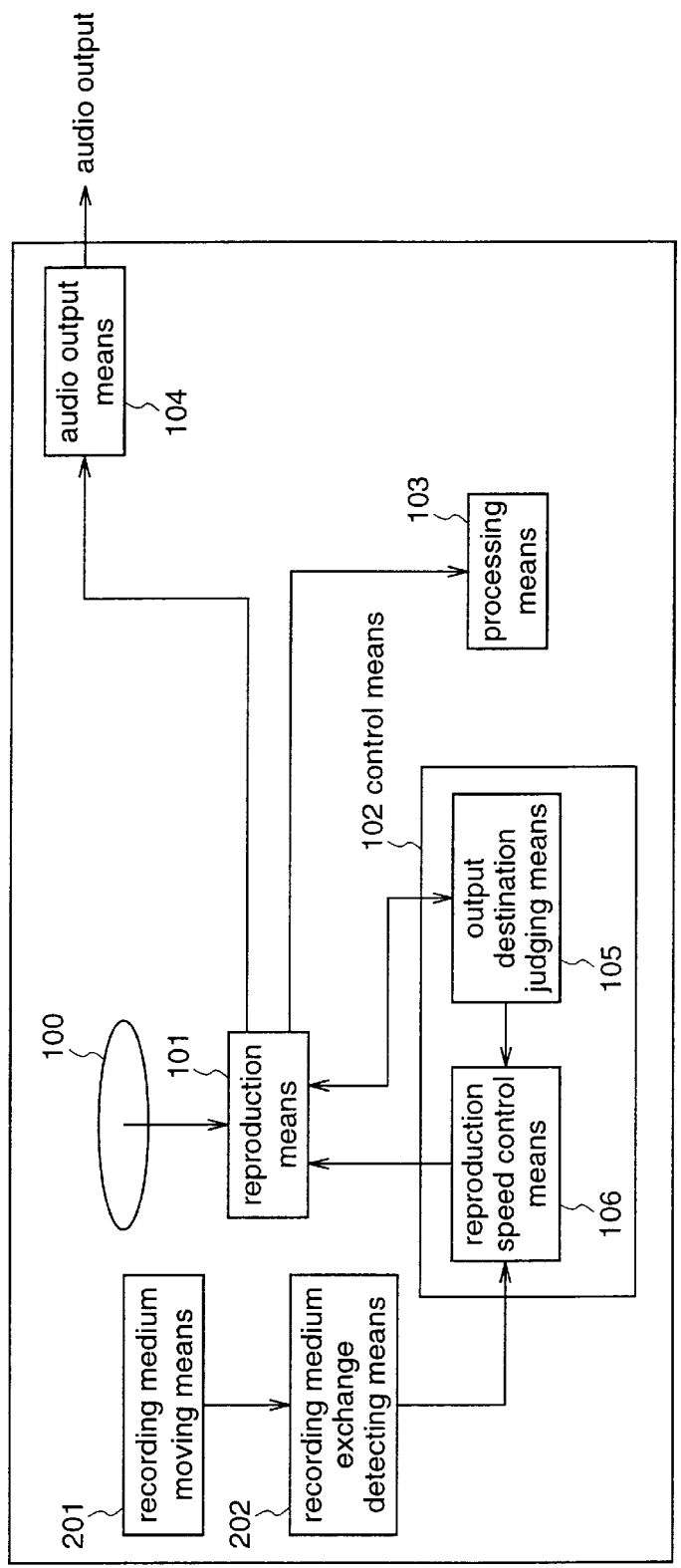
FIG. 3 is a block diagram illustrating an example of a data reproduction apparatus according to a second embodiment of the present invention.

FIG. 3 is a block diagram illustrating an example of the data reproduction apparatus according to the second embodiment of the invention.

In FIG. 3, the data reproduction apparatus according to the present invention comprises the reproduction means 101, the control means 102, the processing means 103, the audio output means 104, a recording medium moving means 201, and a recording medium exchange detecting means 202.

The recording medium moving means 201 locates the disk 100 as a recording medium in a reproducible state in the data reproduction apparatus, and ejects the disk 100 from the data reproduction apparatus to perform exchange or the like of the disk 100.

The recording medium exchange detecting means 202 detects that the recording medium moving means 201 ejects and relocates the disk, and outputs a signal indicating that the disk 100 has been exchanged, to the reproduction speed control means 106 in the control means 102.

Figure 4:
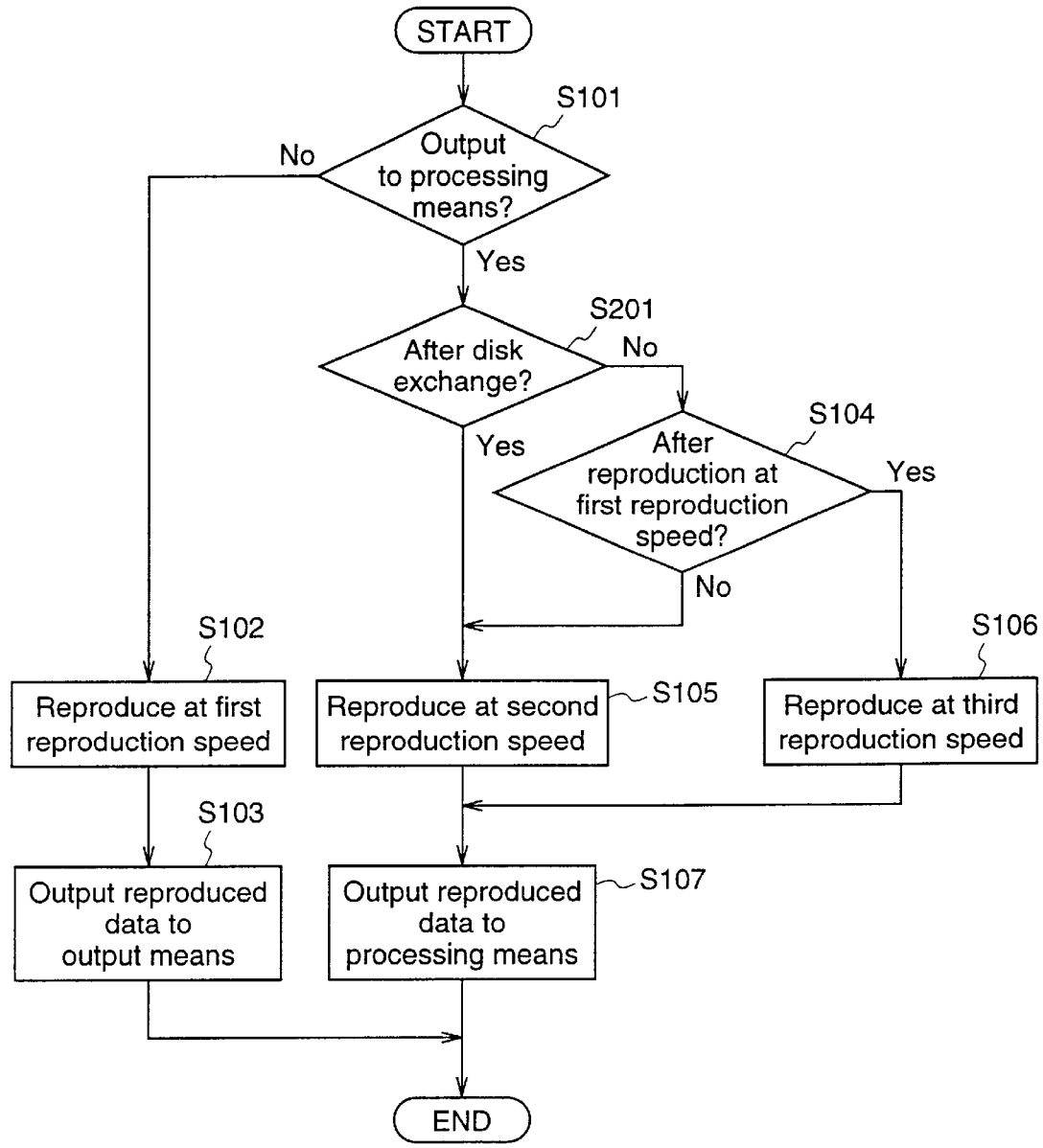
FIG. 4 is a flow chart illustrating a data reproduction method according to the second embodiment of the invention.

FIG. 4 is a flow chart illustrating a data reproduction method executed by the data reproduction apparatus according to the second embodiment of the present invention.

Hereinafter, a description will be given of the operation performed by each part in FIG. 3 in each step of the data reproduction method according to the second embodiment illustrated in FIG. 4.

(Step S101) The output destination judging means 105 judges whether data to be reproduced by the reproduction means 101 should be outputted to the processing means 103 or the audio output means 104 as an output means, on the basis of the contents of the data to be reproduced. Specifically, for example, when the data to be reproduced are music data of the CD-DA standard which are to be sequentially converted and outputted, the judging means 105 judges that the data are to be outputted to the audio output means 104 as an output means. When the data to be reproduced are data of the CD-ROM standard, such as program data, which are to be temporarily stored in the processing means 103, the judging means 105 judges that the data are to be outputted to the processing means 103.

When the output destination judging means 105 judges to output the data to be reproduced to the audio output means 104 as an output means, the process goes to Step S102. On the other hand, when the output destination judging means 105 judges to output the data to be reproduced to the processing means 103, the process goes to Step S201.

(Step S102) The reproduction speed control means 106 controls the reproduction means 101 so as to reproduce the data on the disk 100 at a first reproduction speed.

The first reproduction speed includes a case where reproduction is performed at the same speed as an audio data reproduction speed that is predetermined by the standard of the disk 100, or a case where data reproduction is performed at a speed higher than the predetermined reproduction speed. When data reproduction is performed at a speed higher than the predetermined reproduction speed, the data on the disk 100, which have been read, are stored in a buffer memory possessed by the reproduction means 101, and are sequentially sent to the audio output means 104 at a predetermined speed, whereby reproduction is carried out. Thus, even when the reproduction means 101 temporarily becomes incapable of data reading due to an external factor such as vibrations or defects on the disk 100, the data stored in the buffer memory can be continuously sent to the audio output means 104, whereby the output data are prevented from being interrupted.

(Step S103) The reproduction means 101 outputs the data reproduced at the first reproduction speed to the audio output means 104 as an output means, on the basis of the instruction from the output destination judging means 105.

(Step S201) The reproduction speed control means 106 judges whether or not data reproduction should be performed after the disk 100 is exchanged. That is, it judges whether or not it is the first data reproduction performed after the reproduction speed control means 106 receives a signal indicating that the disk 100 is exchanged, which signal is outputted from the recording medium exchange detecting means 202.

When it is not data reproduction performed after the disk 100 is exchanged, the process goes to Step S104, and when it is judged as data reproduction performed after the disk 100 is exchanged, the process goes to Step S105.

(Step S104) The reproduction speed control means 106 judges whether it is after reproduction at the first reproduction speed or not. When it is not after reproduction at the first speed, the process goes to Step S105, and when it is after reproduction at the first speed, the process goes to Step S106. The reproduction speed control means 106 stores whether or not the disk 100 is reproduced at the first reproduction speed before the data to be reproduced.

(Step S105) The reproduction speed control means 106 controls the reproduction means 101 so as to reproduce the data on the disk 100 at a second reproduction speed.

The second reproduction speed is generally a maximum reproduction speed the data reproduction apparatus can realize. However, in the case of using a disk of the CD-ROM standard, there are data having error correcting information (ECC) for program and data, and data in a format having no error correcting information. When the latter data are to be read, reproduction is sometimes performed at a reproduction speed lower than the maximum reproduction speed the data reproduction apparatus can realize, in order to prevent reliability of the data from being reduced.

(Step S106) The reproduction speed control means 106 controls the reproduction means 101 so as to reproduce the data on the disk 100 at a third reproduction speed.

The third reproduction speed is higher than the first reproduction speed and lower than the second reproduction speed.

(Step S107) The reproduction means 101 outputs the reproduced data to the processing means 103 on the basis of the instruction from the output destination judging means 105.

Control of the reproduction speed by the reproduction means 101 is performed by changing the disk rotation speed when data are recorded at a constant angular velocity (hereinafter, referred to as "CAV") on tracks formed concentrically or spirally on the disk 100, or by changing the reproduction linear speed or the disk rotation speed when data are recorded at a constant linear velocity (hereinafter, referred to as "CLV") on tracks formed concentrically or spirally on the disk 100.

As described above, according to the data reproduction apparatus and the data reproduction method of the second embodiment, in the case where reproduction of the data of the CD-ROM standard or the like, which data are temporarily stored in the processing unit 103, is performed after reproduction of the disk at the first reproduction speed, the reproduction is performed not at the highest second reproduction speed but at the third reproduction speed. Thus, the reproduction speed is switched between the first reproduction speed and the third reproduction speed, whereby power consumption and heat generation are reduced and the time required for switching the reproduction speed is reduced, as compared with the case where the reproduction speed is switched between the first reproduction speed and the second reproduction speed. In addition, thereafter, when the audio data of the CD-DA standard or the like are reproduced, power consumption and heat generation required for switching the data reproduction speed to the first reproduction speed are reduced, and the time required for switching the reproduction speed is reduced.

Further, according to the data reproduction apparatus and the data reproduction method of the second embodiment, when the data of the CD-ROM standard or the like, which are temporarily stored in the processing means 103, are reproduced after the disk 100 is exchanged, the data reproduction is performed at the highest second reproduction speed even after data reproduction has been performed at the first reproduction speed. Therefore, the highest second reproduction speed can be used when the data of the CD-ROM standard, which are temporarily stored in the processing means 103, are reproduced first after disk exchange, whereby the performance of the drive can be enhanced. Particularly, in the case where only the data of the CD-ROM standard, which are temporarily stored in the processing unit 103, are reproduced after the disk 100 is exchanged, disk reproduction can always be performed at the highest second reproduction speed.

(Embodiment 3)

Next, a data reproduction apparatus and a data reproduction method according to a third embodiment of the present invention will be described with reference to FIGS. 5 and 6. The same constituents as those described in the second embodiment are denoted by the same reference numerals, and description thereof will be omitted.

The data reproduction apparatus or data reproduction method according to the second embodiment of the present invention judges that the reproduction frequency of the audio data of the CD-DA standard or the like is low when the audio data of the CD-DA standard or the like, which are sequentially converted and outputted, are not reproduced by the reproduction means for a predetermined period of time, and thereafter, performs reproduction at a fourth reproduction speed that is higher than the third reproduction speed and lower than the second reproduction speed under certain conditions, instead of the third reproduction speed, when the data of the CD-ROM standard are reproduced.

Figure 5:
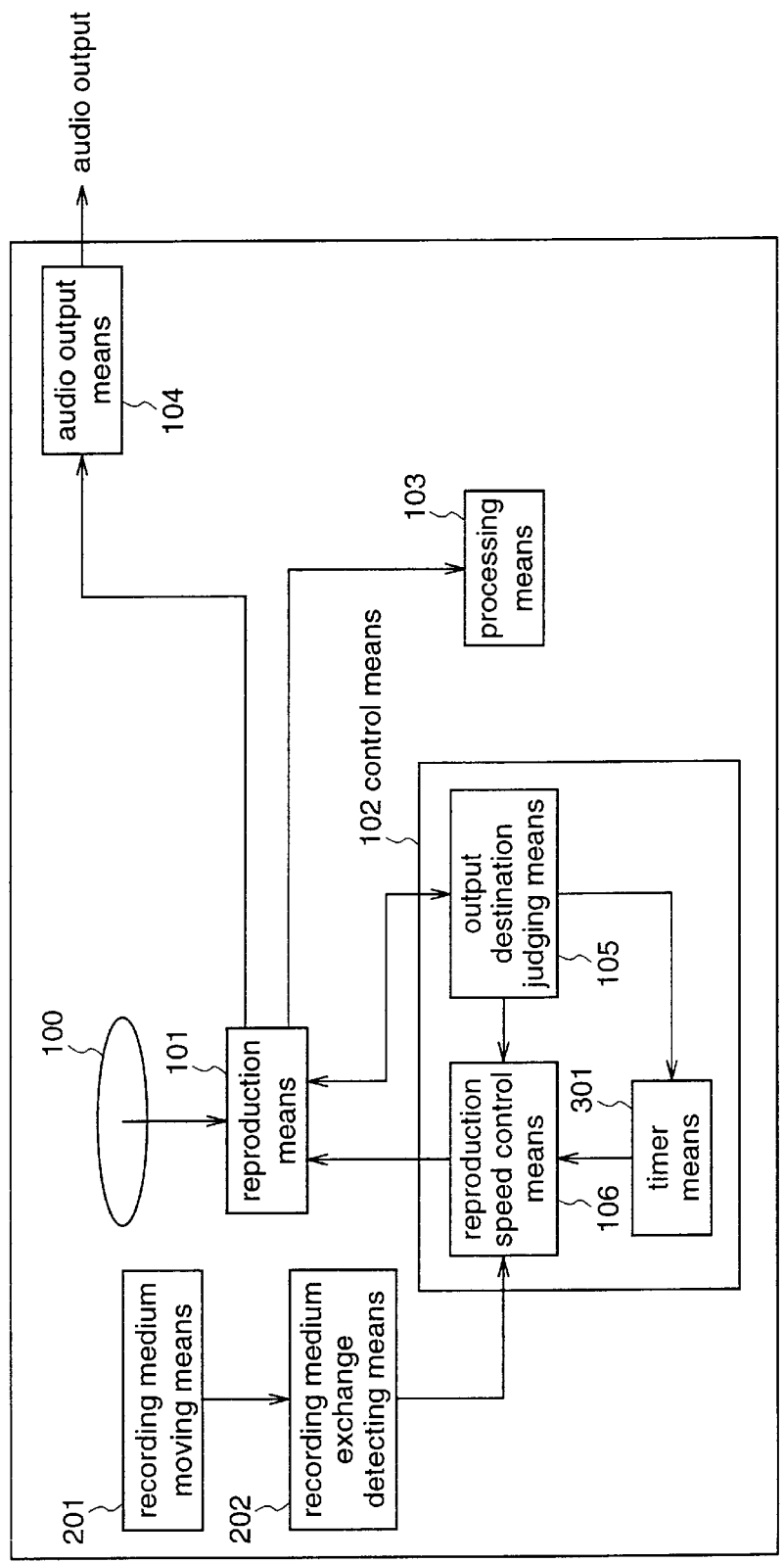
FIG. 5 is a block diagram illustrating an example of a data reproduction apparatus according to a third embodiment of the present invention.

FIG. 5 is a block diagram illustrating an example of the data reproduction apparatus according to the third embodiment of the present invention.

In FIG. 5, the data reproduction apparatus according to the invention comprises the reproduction means 101, the control means 102, the processing means 103, the audio output means 104, the recording medium moving means 201, and the recording medium exchange detecting means 202.

The control means 102 is provided with, in addition to the output destination judging means 105 and the reproduction speed control means 106, a timer means 301 which outputs a notification signal for notifying the reproduction speed control means 106 that the reproduction means 101 has not outputted the reproduced data to the audio output means 104 as an output means for a predetermined period of time.

Figure 6:
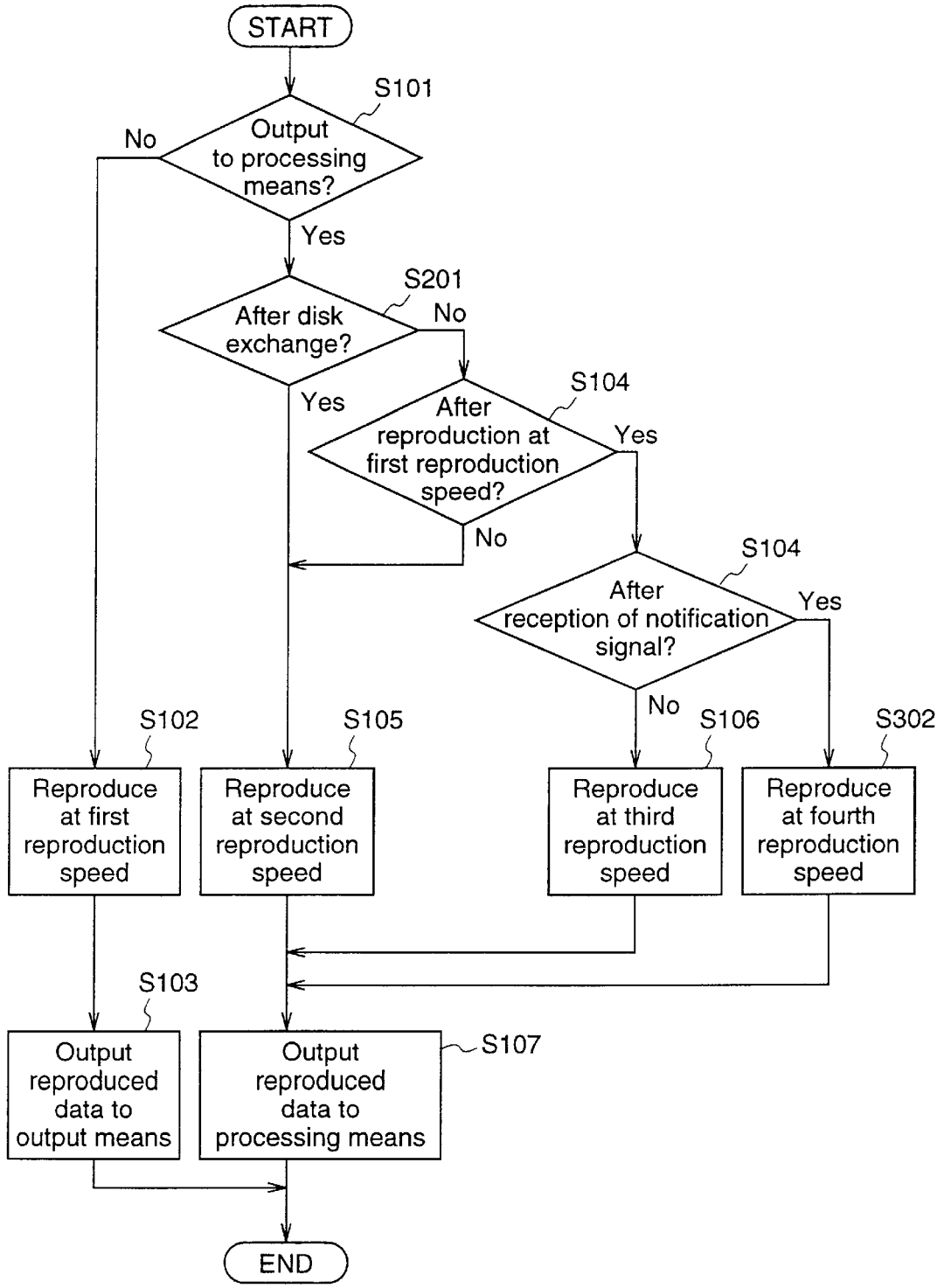
FIG. 6 is a flow chart illustrating a data reproduction method according to the third embodiment of the invention.

FIG. 6 is a flow chart illustrating a data reproduction method executed by the data reproduction apparatus according to the third embodiment of the invention.

Hereinafter, a description will be given of the operation performed by each part in FIG. 5 in each step of the data reproduction method according to the third embodiment illustrated in FIG. 6.

(Step S101) The output destination judging means 105 judges whether data to be reproduced by the reproduction means 101 should be outputted to the processing means 103 or the audio output means 104 as an output means, on the basis of the contents of the data to be reproduced. Specifically, for example, when the data to be reproduced are music data of the CD-DA standard which are to be sequentially converted and outputted, the judging means 105 judges that the data are to be outputted to the audio output means 104 as an output means. When the data to be reproduced are data of the CD-ROM standard, such as program data, which are to be temporarily stored in the processing means 103, the judging means 105 judges that the data are to be outputted to the processing means 103.

When the output destination judging means 105 judges to output the data to be reproduced to the audio output means 104 as an output means, the process goes to Step S102. On the other hand, when the output destination judging means 105 judges to output the data to be reproduced to the processing means 103, the process goes to Step S201.

(Step S102) The reproduction speed control means 106 controls the reproduction means 101 so as to reproduce the data on the disk 100 at a first reproduction speed.

The first reproduction speed includes a case where reproduction is performed at the same speed as an audio data reproduction speed that is predetermined by the standard of the disk 100, or a case where data reproduction is performed at a speed higher than the predetermined reproduction speed. When data reproduction is performed at a speed higher than the predetermined reproduction speed, the data on the disk 100, which have been read, are stored in a buffer possessed by the reproduction means 101, and are sequentially sent to the audio output means 104 at a predetermined speed, whereby reproduction is carried out. Thus, even when the reproduction means 101 temporarily becomes incapable of data reading due to an external factor such as vibrations or defects on the disk 100, the data stored in the buffer can be continuously sent to the audio output means 104, whereby the output data are prevented from being interrupted.

(Step S103) The reproduction means 101 outputs the data reproduced at the first reproduction speed to the audio output means 104 as an output means, on the basis of the instruction from the output destination judging means 105.

(Step S201) The reproduction speed control means 106 judges whether or not data reproduction should be performed after the disk 100 is exchanged. That is, it judges whether or not it is the first data reproduction performed after the reproduction speed control means 106 receives a signal indicating that the disk 100 is exchanged, which signal is outputted from the recording medium exchange detecting means 202.

When it is not data reproduction performed after the disk 100 is exchanged, the process goes to Step S104, and when it is judged as data reproduction performed after the disk 100 is exchanged, the process goes to Step S105.

(Step S104) The reproduction speed control means 106 judges whether it is after reproduction at the first reproduction speed or not. When it is not after reproduction at the first speed, the process goes to Step S105, and when it is after reproduction at the first speed, the process goes to Step S301. The reproduction speed control means 106 stores whether or not the disk 100 is reproduced at the first reproduction speed before the data to be reproduced.

(Step S105) The reproduction speed control means 106 controls the reproduction means 101 so as to reproduce the data on the disk 100 at a second reproduction speed.

The second reproduction speed is generally a maximum reproduction speed the data reproduction apparatus can realize. However, in the case of using a disk of the CD-ROM standard, there are data having error correcting information (ECC) for program and data, and data in a format having no error correcting information. When the latter data are to be read, reproduction is sometimes performed at a reproduction speed lower than the maximum reproduction speed the data reproduction apparatus can realize, in order to prevent reliability of the data from being reduced.

(Step S301) The reproduction speed control means 106 judges whether or not it receives a notification signal from the timer means 301, which signal notifies that the reproduction means 101 has not outputted the reproduced data to the audio output means 104 as an output means for a predetermined period of time. That is, it judges whether or not it is after the notification signal outputted from the timer means 301 is received.

When it is after the notification signal outputted from the timer means 301 is received, the process goes to Step S302, and, when it is not after the notification signal outputted from the timer means 301 is received, the process goes to Step S106.

(Step S302) The reproduction speed control means 106 controls the reproduction means 101 so as to reproduce data on the disk 100 at a fourth reproduction speed.

The fourth reproduction speed is higher than the third reproduction speed and lower than the second reproduction speed.

(Step S106) The reproduction speed control means 106 controls the reproduction means 101 so as to reproduce the data on the disk 100 at a third reproduction speed.

The third reproduction speed is higher than the first reproduction speed and lower than the second reproduction speed.

(Step S107) The reproduction means 101 outputs the reproduced data to the processing means 103 on the basis of the instruction from the output destination judging means 105.

Control of the reproduction speed by the reproduction means 101 is performed by changing the disk rotation speed when data are recorded at a constant angular velocity (hereinafter, referred to as "CAV") on tracks formed concentrically or spirally on the disk 100, or by changing the reproduction linear speed or the disk rotation speed when data are recorded at a constant linear velocity (hereinafter, referred to as "CLV") on tracks formed concentrically or spirally on the disk 100.

As described above, according to the data reproduction apparatus and the data reproduction method of the third embodiment, in the case where reproduction of the data of the CD-ROM standard or the like, which data are temporarily stored in the processing unit 103, is performed after reproduction of the disk at the first reproduction speed, the reproduction is performed not at the highest second reproduction speed but at the third reproduction speed. Thus, the reproduction speed is switched between the first reproduction speed and the third reproduction speed, whereby power consumption and heat generation are reduced and the time required for switching the reproduction speed is reduced, as compared with the case where the reproduction speed is switched between the first reproduction speed and the second reproduction speed. In addition, thereafter, when the audio data of the CD-DA standard or the like are reproduced, power consumption and heat generation required for switching the data reproduction speed to the first reproduction speed are reduced, and the time required for switching the reproduction speed is reduced.

Further, according to the data reproduction apparatus and the data reproduction method of the third embodiment, when the reproduction means 101 does not reproduce the audio data of the CD-DA standard or the like, which are to be sequentially converted and outputted, for a predetermined period of time, it is judged that the reproduction frequency of the audio data of the CD-DA standard or the like, which are to be reproduced at the first reproduction speed, is low, and thereafter, when the data of the CD-ROM standard, which are temporarily stored in the processing means 103, are reproduced after the data on the disk is reproduced at the first reproduction speed, reproduction is performed at the fourth reproduction speed instead of the third reproduction speed, whereby the performance of the drive can be enhanced.

Further, when the fourth reproduction speed is approximately equal to the second reproduction speed, the performance of the drive can be further enhanced. Particularly, in the case where the audio data of the CD-DA standard or the like, which are to be sequentially converted and outputted, are hardly reproduced, switching of the reproduction speed, which causes an increase in power consumption or heat generation, is hardly needed.

While in this third embodiment whether the disk 100 is exchanged or not is employed as a determinant of performing control of the reproduction speed of the disk 100, control of the reproduction speed of the disk 100 may be performed according to only whether the reproduction speed control means 106 receives the notification signal or not, without performing control of the reproduction speed of the disk 100 according to whether the disk 100 is exchanged or not.

(Embodiment 4)

A data reproduction apparatus and a data reproduction method of a fourth embodiment of the present invention performs reproduction at a fourth reproduction speed that is higher than the third reproduction speed and lower than the second reproduction speed, instead of the third reproduction speed, in the case where the reproduction means does not perform data reproduction for a predetermined period of time after audio data of the CD-DA standard or the like which are to be sequentially converted and outputted are reproduced and, thereafter, data of the CD-ROM standard or the like which are temporarily stored in the processing means 103 are reproduced first. That is, the data reproduction speed is increased to enhance the performance of the drive when the frequency of change in the reproduction speed, which causes an increase in power consumption or heat generation in the data reproduction apparatus, is low.

Although the data reproduction apparatus and the data reproduction method according to the fourth embodiment are fundamentally identical to those of the third embodiment, those of the fourth embodiment are different from those of the third embodiment only in that the timer means 301 of the third embodiment outputs a notification signal for notifying the reproduction speed control means 106 that the reproduction means 101 has not outputted the reproduced data to the processing means 103 and the audio output means 104 as an output means, for a predetermined period of time.

According to the data reproduction apparatus and the data reproduction method of the fourth embodiment, in the case where the reproduction means does not perform data reproduction for a predetermined period of time after audio data of the CD-DA standard or the like which are to be sequentially converted and outputted are reproduced, and thereafter, data of the CD-ROM standard which are temporarily stored in the processing means 103 are reproduced first, the reproduction is performed at the fourth reproduction speed instead of the third reproduction speed, whereby the performance of the drive can be enhanced.

Further, when the fourth reproduction speed is increased until it becomes approximately equal the second reproduction speed, the performance of the drive can be further enhanced. Particularly, in the case where the audio data of the CD-DA standard which are to be sequentially converted and outputted are hardly reproduced, switching of the reproduction speed, which causes an increase in power consumption or heat generation, is hardly needed.

While in this fourth embodiment whether the disk 100 is exchanged or not is employed as a determinant of performing control of the reproduction speed of the disk 100, control of the reproduction speed of the disk 100 may be performed according to only whether the reproduction speed control means 106 receives the notification signal or not, without performing control of the reproduction speed of the disk 100 according to whether the disk 100 is exchanged or not.

While the data reproduction apparatuses for reproducing disk type recording mediums are described in the respective embodiments of the invention, the present invention is also applicable to data reproduction apparatuses for reproducing recoding mediums using other recording methods, for example, a digital audio tape and the like.

While in the above-described embodiments data which are to be read at a high speed and temporarily stored, such as usual program data, are stored in the processing unit 103 of the data reproduction apparatus, data read at a high speed, such as program data, may be transmitted to a host computer or the like outside the data reproduction apparatus to be processed by the host computer.

Further, the same effects as those described in the respective embodiments can also be achieved by reproducing, using a data reproduction system, a recording medium on which a program for implementing a data reproduction method described in any of the embodiments is recorded, i.e., by reading and executing the program stored in the recording medium, using a main processing unit such as a CPU in the data reproduction system. As a recording medium on which the program is recorded, there can be employed a floppy disk, a hard disk, an optical disk, a magnetic disk, a magneto-optical disk, a CD-ROM, a magnetic tape, a punch card, a non-volatile memory card, a ROM, or the like.

APPLICABILITY IN INDUSTRY

As described above, a data reproduction apparatus and a data reproduction method as well as a data reproducing program recording medium according to the present invention are suited for being employed in a data reproduction apparatus which reproduces data of different standards.

What is claimed is:

1. A data reproduction apparatus comprising:
   a reproduction means for reproducing a recording medium on which data are recorded, and outputting the data;
   at least one output means for outputting input data while sequentially converting the input data into a form of such as an audio signal or a video signal that can be outputted to the outside;
   a processing means for temporarily storing the data reproduced by the reproduction means, and processing the data as required after the reproduction of the recording medium is ended;
   an output destination judging means for judging whether the data to be reproduced by the reproduction means should be outputted to the output means or the processing means; and
   a reproduction speed control means for controlling the reproduction means so as to reproduce the recording medium at a first reproduction speed when the output destination judging means judges that the data in the recording medium are to be outputted to the output means, controlling the reproduction means so as to reproduce the recording medium at a second reproduction speed higher than the first reproduction speed when the output destination judging means judges that the data in the recording medium are to be outputted to the processing means except after the reproduction has been performed at the first reproduction speed, and controlling the reproduction means so as to reproduce the recording medium at a third reproduction speed that is higher than the first reproduction speed and lower than the second reproduction speed when the output destination judging means judges that the data in the recording medium are to be outputted to the processing means after the reproduction has been performed at the first reproduction speed.

2. A data reproduction apparatus as defined in claim 1, wherein the third reproduction speed is approximately equal to the first reproduction speed.

3. A data reproduction apparatus as defined in claim 1 further comprising:
   a recording medium moving means for locating the recording medium in a reproducible state in the reproduction apparatus, and ejecting the recording medium from the reproduction apparatus; and
   a recording medium exchange detecting means for detecting that the recording medium is ejected and relocated by the recording medium moving means;
   wherein the reproduction speed control means controls the reproduction means so as to reproduce the recording medium at the second reproduction speed when the output destination judging means judges that the data in the recording medium are to be outputted to the processing means after the recording medium exchange detecting means detects exchange of the recording medium.

4. A data reproduction apparatus as defined in claim 1 further comprising:
   a timer unit for outputting a notification signal which notifies that the reproduction means has not outputted the reproduced data to the output means and the processing means for a predetermined period of time;
   wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

5. A data reproduction apparatus as defined in claim 1 further comprising:
   a timer unit for outputting a notification signal which notifies that the reproduction means has not outputted the reproduced data to the output means and the processing means for a predetermined period of time;
   wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

6. A data reproduction apparatus as defined in claim 4, wherein the fourth reproduction speed is approximately equal to the second reproduction speed.

7. A data reproduction apparatus as defined in claim 1, wherein, on a disk, data are recorded at a constant angular velocity on tracks formed concentrically or spirally, and the reproduction speed is switched by changing the disk rotation speed.

8. A data reproducing device as defined in claim 1, wherein, on a disk, data are recorded at a constant linear velocity on tracks formed concentrically or spirally, and the reproduction speed is switched by changing the reproduction linear speed or the disk rotation speed.

9. A data reproduction apparatus as defined in claim 2 further comprising:
   a recording medium moving means for locating the recording medium in a reproducible state in the reproduction apparatus, and ejecting the recording medium from the reproduction apparatus; and
   a recording medium exchange detecting means for detecting that the recording medium is ejected and relocated by the recording medium moving means;
   wherein the reproduction speed control means controls the reproduction means so as to reproduce the recording medium at the second reproduction speed when the output destination judging means judges that the data in the recording medium are to be outputted to the processing means after the recording medium exchange detecting means detects exchange of the recording medium.

10. A data reproduction apparatus as defined in claim 2 further comprising:
    a timer unit for outputting a notification signal which notifies that the reproduction means has not outputted the reproduced data to the output means and the processing means for a predetermined period of time;
    wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

11. A data reproduction apparatus as defined in claim 3 further comprising:
    a timer unit for outputting a notification signal which notifies that the reproduction means has not outputted the reproduced data to the output means and the processing means for a predetermined period of time;
    wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

12. A data reproduction apparatus as defined in claim 2 further comprising:
    a timer unit for outputting a notification signal which notifies that the reproduction means has not outputted the reproduced data to the output means and the processing means for a predetermined period of time;
    wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

13. A data reproduction apparatus as defined in claim 3 further comprising:
    a timer unit for outputting a notification signal which notifies that the reproduction means has not outputted the reproduced data to the output means and the processing means for a predetermined period of time;
    wherein the reproduction speed control means controls the reproduction means so as to reproduce the recording medium at a fourth reproduction speed that is higher than the third reproduction speed and lower than the second reproduction speed when the output destination judging means judges that the data in the recording medium are to be outputted to the processing means after the notification signal outputted from the timer unit is received.

14. A data reproduction apparatus as defined in claim 10, wherein the fourth reproduction speed is approximately equal to the second reproduction speed.

15. A data reproduction apparatus as defined in claim 11, wherein the fourth reproduction speed is approximately equal to the second reproduction speed.

16. A data reproduction apparatus as defined in claim 5, wherein the fourth reproduction speed is approximately equal to the second reproduction speed.

17. A data reproduction apparatus as defined in claim 12, wherein the fourth reproduction speed is approximately equal to the second reproduction speed.

18. A data reproduction apparatus as defined in claim 13, wherein the fourth reproduction speed is approximately equal to the second reproduction speed.

19. A data reproduction apparatus as defined in claim 2, wherein, on a disk, data are recorded at a constant angular velocity on tracks formed concentrically or spirally, and the reproduction speed is switched by changing the disk rotation speed.

20. A data reproduction apparatus as defined in claim 3, wherein, on a disk, data are recorded at a constant angular velocity on tracks formed concentrically or spirally, and the reproduction speed is switched by changing the disk rotation speed.

21. A data reproduction apparatus as defined in claim 4, wherein, on a disk, data are recorded at a constant angular velocity on tracks formed concentrically or spirally, 22. A data reproduction apparatus as defined in claim 10, wherein, on a disk, data are recorded at a constant angular velocity on tracks formed concentrically or spirally, and the reproduction speed is switched by changing the disk rotation speed.

23. A data reproduction apparatus as defined in claim 11, wherein, on a disk, data are recorded at a constant angular velocity on tracks formed concentrically or spirally, and the reproduction speed is switched by changing the disk rotation speed.

24. A data reproduction apparatus as defined in claim 5, wherein, on a disk, data are recorded at a constant angular velocity on tracks formed concentrically or spirally, and the reproduction speed is switched by changing the disk rotation speed.

25. A data reproduction apparatus as defined in claim 12, wherein, on a disk, data are recorded at a constant angular velocity on tracks formed concentrically or spirally, and the reproduction speed is switched by changing the disk rotation speed.

26. A data reproduction apparatus as defined in claim 13, wherein, on a disk, data are recorded at a constant angular velocity on tracks formed concentrically or spirally, and the reproduction speed is switched by changing the disk rotation speed.

27. A data reproduction apparatus as defined in claim 6, wherein, on a disk, data are recorded at a constant angular velocity on tracks formed concentrically or spirally, and the reproduction speed is switched by changing the disk rotation speed.

28. A data reproduction apparatus as defined in claim 14, wherein, on a disk, data are recorded at a constant angular velocity on tracks formed concentrically or spirally, and the reproduction speed is switched by changing the disk rotation speed.

29. A data reproduction apparatus as defined in claim 15, wherein, on a disk, data are recorded at a constant angular velocity on tracks formed concentrically or spirally, and the reproduction speed is switched by changing the disk rotation speed.

30. A data reproduction apparatus as defined in claim 16, wherein, on a disk, data are recorded at a constant angular velocity on tracks formed concentrically or spirally, and the reproduction speed is switched by changing the disk rotation speed.

31. A data reproduction apparatus as defined in claim 17, wherein, on a disk, data are recorded at a constant angular velocity on tracks formed concentrically or spirally, and the reproduction speed is switched by changing the disk rotation speed.

32. A data reproduction apparatus as defined in claim 17, wherein, on a disk, data are recorded at a constant angular velocity on tracks formed concentrically or spirally, and the reproduction speed is switched by changing the disk rotation speed.

33. A data reproducing device as defined in claim 2, wherein, on a disk, data are recorded at a constant linear velocity on tracks formed concentrically or spirally, and the reproduction speed is switched by changing the reproduction linear speed or the disk rotation speed.

34. A data reproducing device as defined in claim 3, wherein, on a disk, data are recorded at a constant linear velocity on tracks formed concentrically or spirally, and the reproduction speed is switched by changing the reproduction linear speed or the disk rotation speed.

35. A data reproducing device as defined in claim 4, wherein, on a disk, data are recorded at a constant linear velocity on tracks formed concentrically or spirally, and the reproduction speed is switched by changing the reproduction linear speed or the disk rotation speed.

36. A data reproducing device as defined in claim 10, wherein, on a disk, data are recorded at a constant linear velocity on tracks formed concentrically or spirally, and the reproduction speed is switched by changing the reproduction linear speed or the disk rotation speed.

37. A data reproducing device as defined in claim 11, wherein, on a disk, data are recorded at a constant linear velocity on tracks formed concentrically or spirally, and the reproduction speed is switched by changing the reproduction linear speed or the disk rotation speed.

38. A data reproducing device as defined in claim 5, wherein, on a disk, data are recorded at a constant linear velocity on tracks formed concentrically or spirally, and the reproduction speed is switched by changing the reproduction linear speed or the disk rotation speed.

39. A data reproducing device as defined in claim 12, wherein, on a disk, data are recorded at a constant linear velocity on tracks formed concentrically or spirally, and the reproduction speed is switched by changing the reproduction linear speed or the disk rotation speed.

40. A data reproducing device as defined in claim 13, wherein, on a disk, data are recorded at a constant linear velocity on tracks formed concentrically or spirally, and the reproduction speed is switched by changing the reproduction linear speed or the disk rotation speed.

41. A data reproducing device as defined in claim 6, wherein, on a disk, data are recorded at a constant linear velocity on tracks formed concentrically or spirally, and the reproduction speed is switched by changing the reproduction linear speed or the disk rotation speed.

42. A data reproducing device as defined in claim 14, wherein, on a disk, data are recorded at a constant linear velocity on tracks formed concentrically or spirally, and the reproduction speed is switched by changing the reproduction linear speed or the disk rotation speed.

43. A data reproducing device as defined in claim 15, wherein, on a disk, data are recorded at a constant linear velocity on tracks formed concentrically or spirally, and the reproduction speed is switched by changing the reproduction linear speed or the disk rotation speed.

44. A data reproducing device as defined in claim 16, wherein, on a disk, data are recorded at a constant linear velocity on tracks formed concentrically or spirally, and the reproduction speed is switched by changing the reproduction linear speed or the disk rotation speed.

45. A data reproducing device as defined in claim 17, wherein, on a disk, data are recorded at a constant linear velocity on tracks formed concentrically or spirally, and the reproduction speed is switched by changing the reproduction linear speed or the disk rotation speed.

46. A data reproducing device as defined in claim 18, wherein, on a disk, data are recorded at a constant linear velocity on tracks formed concentrically or spirally, and the reproduction speed is switched by changing the reproduction linear speed or the disk rotation speed.

47. A data reproduction method comprising:

a reproducing step of reproducing a recording medium on which data are recorded, and outputting the data;

at least one output step of outputting input data while sequentially converting the input data into a form of such as an audio signal or a video signal that can be outputted to the outside;

a processing step of temporarily storing the data reproduced in the reproduction step, and processing the data as required after the reproduction of the recording medium is ended;

an output destination judging step of judging whether the data to be reproduced in the reproduction step should be outputted to the output step or the processing step; and a reproduction speed control step of controlling the reproduction step so as to reproduce the recording medium at a first reproduction speed when the output destination judging step judges that the data in the recording medium are to be outputted to the output step, controlling the reproduction step so as to reproduce the recording medium at a second reproduction speed higher than the first reproduction speed when the output destination judging step judges that the data in the recording medium are to be outputted to the processing step except after the reproduction has been performed at the first reproduction speed, and controlling the reproduction step so as to reproduce the recording medium at a third reproduction speed that is higher than the first reproduction speed and lower than the second reproduction speed when the output destination judging step judges that the data in the recording medium are to be outputted to the processing step after the reproduction has been performed at the first reproduction speed.

48. A data reproduction method as defined in claim 47 further comprising:

a recording medium moving step of locating the recording medium in a reproducible state in a reproduction apparatus, and ejecting the recording medium from the reproduction apparatus; and a recording medium exchange detecting step of detecting that the recording medium is ejected and relocated in the recording medium moving step;

wherein the reproduction speed control step controls the reproduction step so as to reproduce the recording medium at the second reproduction speed when the output destination judging step judges that the data in the recording medium are to be outputted to the processing step after the recording medium exchange detecting step detects exchange of the recording medium.

49. A data reproduction method as defined in claim 47 further comprising:

a timer unit for outputting a notification signal which notifies that the reproduction step has not outputted the reproduced data to the output step and the processing step for a predetermined period of time;

wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

50. A data reproduction method as defined in claim 47 further comprising:

a timer unit for outputting a notification signal which notifies that the reproduction step has not outputted the reproduced data to the output step and the processing step for a predetermined period of time;

wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

51. A data reproduction method as defined in claim 48 further comprising:

a timer unit for outputting a notification signal which notifies that the reproduction step has not outputted the reproduced data to the output step and the processing step for a predetermined period of time;

wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

52. A data reproduction method as defined in claim 48 further comprising:

a timer unit for outputting a notification signal which notifies that the reproduction step has not outputted the reproduced data to the output step and the processing step for a predetermined period of time;

wherein the reproduction speed control step controls the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

53. A recording medium containing a program for executing a data reproduction method as defined in claim 47, wherein the program comprises:

a reproducing step of reproducing a recording medium on which data are recorded, and outputting the data;

at least one output step of outputting input data while sequentially converting the input data into a form of such as an audio signal or a video signal that can be outputted to the outside;

a processing step of temporarily storing the data reproduced in the reproduction step, and processing the data as required after the reproduction of the recording medium is ended;

an output destination judging step of judging whether the data to be reproduced in the reproduction step should be outputted to the output step or the processing step; and a reproduction speed control step of controlling the reproduction step so as to reproduce the recording medium at a fourth reproduction speed that is higher than the third reproduction speed and lower than the second reproduction speed when the output destination judging step judges that the data in the recording medium are to be outputted to the processing step after the notification signal outputted from the timer unit is received.

54. A recording medium containing a program for executing a data reproduction method as defined in claim 47, wherein the program comprises:

a reproducing step of reproducing a recording medium on which data are recorded, and outputting the data;

at least one output step of outputting input data while sequentially converting the input data into a form of such as an audio signal or a video signal that can be outputted to the outside;

a processing step of temporarily storing the data reproduced in the reproduction step, and processing the data as required after the reproduction of the recording medium is ended;

an output destination judging step of judging whether the data to be reproduced in the reproduction step should be outputted to the output step or the processing step; and a reproduction speed control step of controlling the reproduction step so as to reproduce the recording medium at a first reproduction speed when the output destination judging step judges that the data in the recording medium are to be outputted to the output step, controlling the reproduction step so as to reproduce the recording medium at a second reproduction speed higher than the first reproduction speed when the output destination judging step judges that the data in the recording medium are to be outputted to the processing step except after the reproduction has been performed at the first reproduction speed, and controlling the reproduction step so as to reproduce the recording medium at a third reproduction speed that is higher than the first reproduction speed and lower than the second reproduction speed when the output destination judging step judges that the data in the recording medium are to be outputted to the processing step after the reproduction has been performed at the first reproduction speed.

* * * * *